UNITED STATES PATENT OFFICE.

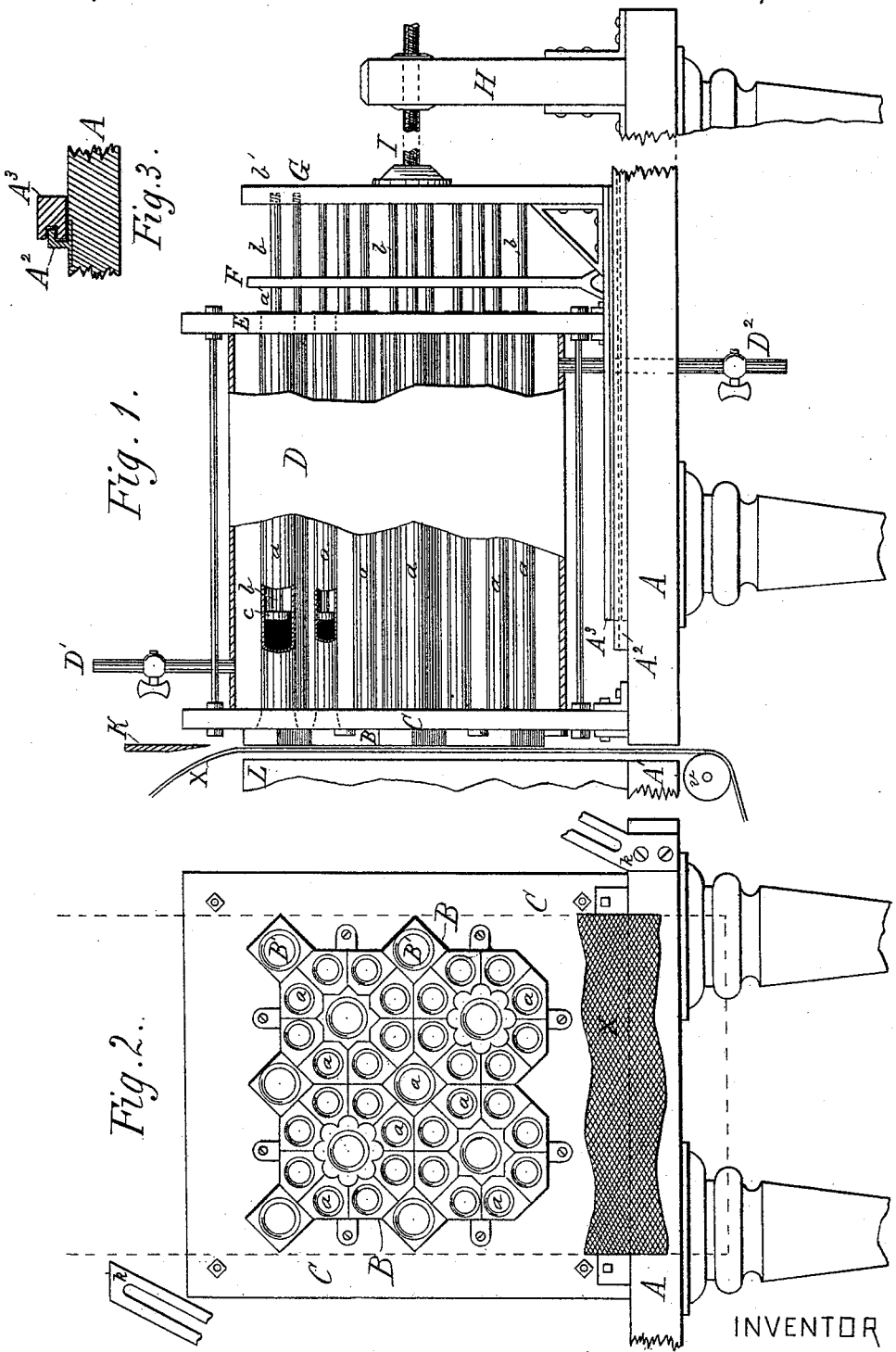

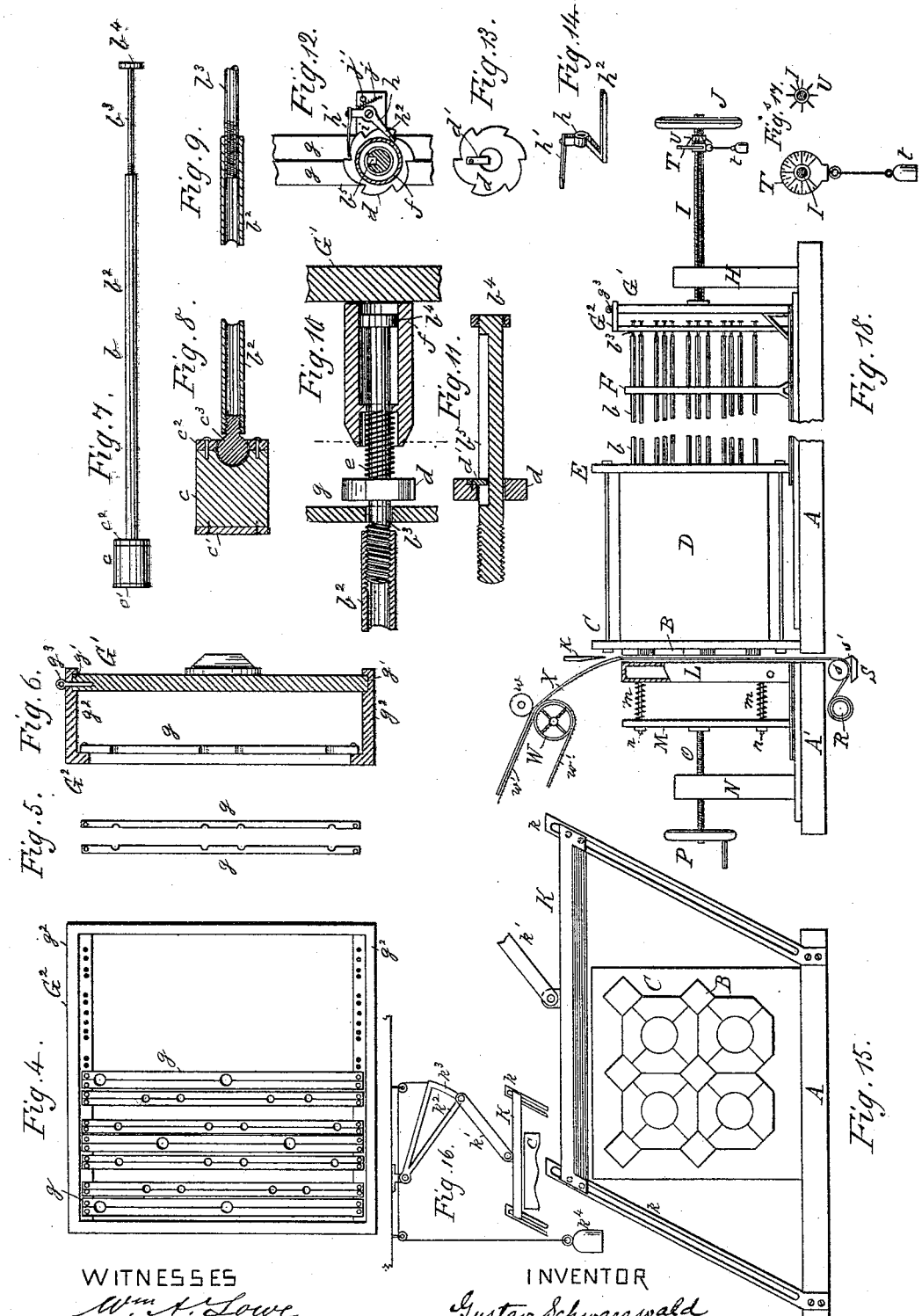

GUSTAV SCHWARZWALD, OF NEW YORK, N. Y., ASSIGNOR OF TWO-FIFTHS TO HENRY NEWMAN, OF SAME PLACE.

MACHINE FOR MAKING FLOOR-CLOTHS, &c., IN VARIOUS COLORS.

SPECIFICATION forming part of Letters Patent No. 328,524, dated October 20, 1885.

Application filed March 5, 1885. Serial No. 157,839. (No model.)

*To all whom it may concern:*

Be it known that I, GUSTAV SCHWARZWALD, a citizen of the United States, residing in the city and county of New York, in the State of New York, have invented a new and useful machine for making floor-cloths, coverings, decorations, pavements, panels, mosaic work, tiling, and kindred manufactures in various colors, of which the following is a specification.

My machine and invention has for its object an arrangement for the manufacture of the before-mentioned structures from plastic materials in various colors by depositing masses of each color independently and simultaneously, and molding such masses into the configuration desired at the time of depositing the same, depositing the masses forming the whole pattern at once or at one operation, or depositing at one operation a section of the desired pattern, so that by repeating the operation upon a contiguous surface the entire pattern or pattern-sheet is formed, whereby I am enabled to produce a manufacture that is homogeneous in structure, and in which each color of the pattern consists of material of such color throughout its entire mass, so that the pattern-colors always appear until the material itself is worn away. I attain these objects by the mechanism illustrated in the drawings, in which—

Figure 1 is a side view of the machine with portions broken away to show the arrangement of the parts, and showing only a part of the platen L. Fig. 2 is a front view of the pattern-mold B secured to the plate C. Fig. 3 is a section of the prolonged feet $A^3$ of the follower-plate G, and the ways $A^2$ for the same. Fig. 4 is a back view of the shield $G^2$. Fig. 5 shows the locking-bars $g$, and Fig. 6 is a side view of the shield $G^2$, follower-plate $G'$ in section. Fig. 7 is a perspective view of the piston $b$. Figs. 8 and 9 show details of the same in section. Figs. 10, 11, 12, 13, and 14 are detail views of the mechanical devices employed to vary the pressure in the feeding-tubes $a$ by automatically lengthening or shortening the pistons. Fig. 15 is a front view of the knife K and its guideways $k\ k$. Fig. 16 is a front view of a convenient knife-operating mechanism. Fig. 17 is a front view of the screw-gage and index T U. Fig. 18 is a side view of the machine, showing the relation of all the parts.

Similar letters of reference indicate like parts.

My machine consists, essentially, of a pattern-mold to shape the material, feeding-tubes to feed the plastic material into the several forms composing the mold, means for forwarding the material into the mold through the tubes, a suitable device to receive the plastic material as it is ejected through the mold, and means to present a base fabric to the pattern-mold, and to cut off the plastic material in layers of suitable thickness when it is desired to do so.

My machine may be conveniently constructed as follows: I lay out the pattern to be made in outline of the exact superficial area desired, and then for each figure of the pattern make from sheet metal or other suitable material forms of the exact configuration desired. It will be convenient for some patterns to take a strong frame, like a printer's chase, of the exact size required in inside measurement, and fit a well-seasoned board into it. On the board lay out the pattern, and with a scroll-saw cut out the various figures of the pattern, preferably using a saw that will make a cut of the thickness of the metal strips of which the forms are to be made. This will give strong blocks to support the metal while the mold is being soldered or otherwise suitably connected. For some patterns the forms can be more conveniently cast or shaped on a former or mandrel, or in other ways well known in the arts, and in some patterns containing frequently-recurring figures one of these may first be made of the exact size required, and a proper number cast therefrom and placed in their appropriate positions, and then the less-frequently occurring figures may be made in other convenient ways and fitted into their places. At the discharging-faces of these pattern-forms I prefer to cut them down to substantially knife-edge, as I believe that will produce the best results with most of the plastic materials generally employed. Commencing a little back from the discharging-edges of these forms—say from half an inch, or thereabout, (more or less,) as convenient—I commence to flare them, decreasing the cross-section cone or funnel shape. This may be done when convenient by casting or otherwise making the forms in funnel shapes having the proper cross-section at the discharging-face, and then attaching these funnels together; or it may be done by making up the pattern originally by laying out the figures, fitting the metal strips, connecting them, and soldering or otherwise attaching at their inner or receiving ends flaring or funnel-shaped terminations, preferably having their feeding ends—the ends away from the discharging-faces—circular in outline to receive the feeding-tubes, which are to be fastened there. In this way I produce the pattern-mold, as B.

For some patterns all, and in other instances some, of the pattern-forms may be made by drawing the metal over a mandrel or former of the proper configuration, so that the pattern-form and tube will be in one piece and of the same configuration throughout its length; but I prefer for general work to make the several pattern-forms flaring, of the exact size and configuration desired at the discharging end and decreasing in size toward the feeding end.

Having made the pattern-mold B so that the discharging-faces will be on a plane, I attach them to a suitable plate, C, provided with holes corresponding to the flaring ends of the forms, into which these ends of the forms are inserted. To these I then screw or otherwise attach the feeding-tubes $a\ a$, which are supported at their other ends in the plate E, through which they pass, and have a suitable collar, $a'$, screwed to them to retain them in position. The plates C E are firmly secured to the bed or table A.

The feeding-tubes $a\ a$ should be carefully proportioned to their several pattern-forms, so as to be of the proper size to discharge into each form proportionately the same quantity of material under the same pressure. This may be conveniently done in some instances by selecting for a standard the tubes to be used for those forms which are all of the same size, and which occur most frequently in the particular pattern under consideration. Through one of such forms I then eject plastic material of a determined thickness of that form—say one-half inch—and note the exact space which that occupies in the feeding-tube, which may be, e. g., one inch in the tube. Through one of the other forms I then discharge as much plastic material as will make a layer of that form one-half inch in thickness, and then by trial or calculation I determine the size of a feeding-tube which will contain that amount of the plastic material in the same space—viz., one inch—and use a tube of that size for such form, and so continue until all of the pattern-forms have their appropriate feeding-tubes ascertained. A convenient way is to discharge a determined thickness of the plastic material of one of the standard forms, roll the same into a ball, measure its diameter, and obtain the capacity of its tube in relation to such diameter. Then proceed in the same way with the other forms and make the tubes of the same size relative to the diameter of such balls.

In some patterns the tubes for the different figures may be readily determined mathematically, while in others trials such as or similar to those I have described will be more convenient.

Further on I will describe a device for automatically varying the pressure in any tubes when necessary or desired.

The feeding-tubes may be made of any desired length, but I believe that a machine having the feeding-tubes about six feet in length will be found useful for general work.

Around this system of tubes a jacket, D, is arranged, into which may be injected through pipes, as $D'\ D^2$, a suitable temperer, as steam, hot or cold water, or air, to temper the plastic material passing through them. This jacket may extend from end to end of the tubes, from the plate C to the plate E, to affect the material throughout the length of the tubes, or the jacket may be made shorter, to affect the material only at or near the discharging ends of the tubes, as may be desired in any particular case, with reference to the material to be manipulated. Into these feeding-tubes suitable pistons, $b$, are fitted, to forward the plastic material and force it out at the pattern-mold B. These may be conveniently made of metal. They consist of the head $c$, fitting snugly in the feeding-tube, and provided with the rod $b$, which may be of iron gas-pipe, or similar piping that is strong and light, and for some work may terminate in screw-points, to be screwed into the follower-plate G. For many of the plastic materials, which are oily and sticky, I use an elastic facing, $c'$, for the plunger-head, which may be of leather or similar material that will retain moisture. This facing may be screwed or cemented onto the plunger-head, and being moistened, makes it comparatively easy to withdraw the plungers when necessary.

For working some patterns I have found that the follower-plate for the pistons, as G, may be conveniently made of a strong board and the piston-rods screwed to it, as shown in Fig. 1; but this would be for the smaller patterns, composed of only few figures. The follower-plate G has prolonged sliding feet $A^2$ moving on the track $A^3$, by means of which it is always kept exactly in line during its movements, and it may be conveniently operated by a screw, I, turning in the standard H, by means of the wheel J. In the drawings a simple screw is shown, but of course any suitable mechanism and gearing, simple or compound, operated by hand or steam power, may be employed for the purpose of actuating the follower-plate, depending upon the size of the pattern to be made and the rapidity with which it is desired to carry on the work.

Between the follower-plate and the end of the feeding-tubes I also employ a piston-support, F, which is simply a plate of wood or metal arranged to slide conveniently on the bed-plate A, and pierced at the proper places with holes, into which the piston-rods are fitted to slide easily opposite to their proper feeding-tubes relative to the pattern to be made. This support F is made to be moved to any point on the piston-rods, and its purpose is to retain all of the pistons in their appropriate places opposite to their feeding-tubes, when, for the purpose of supplying material, or for any other reason it becomes necessary to withdraw them from their feeding-tubes, or from the support of the follower-plate. In order that the system of pistons may be readily inserted into the tubes, the rear ends of the tubes or their collars $a'$ are enlarged, funnel-shaped, to receive the pistons.

As a guide to aid in operating the screw I, the dial and index shown in Fig. 17 may be employed. T is a dial arranged to ride on the screw I, having spaces marked off on its face, and held in position by the weight $t$. U is an index which turns with the screw, and presents a number of pointers, which may be differently colored, by any one of which that is convenient the workman at the screw may guide himself in operating it as the work progresses.

For general purposes and large work the devices shown in Figs. 4 to 6 are used in place of the single follower-plate G. These consist of a follower-plate, G', and shield $G^2$. The shield $G^2$ is rigidly attached to the rear end of the prolonged feet $A^3$. It consists, essentially, of a strong metal frame having projecting shoulders $g^2$ $g^2$ on its upper and lower sides, and in those shoulders the transverse grooves $g'$ $g'$, as shown in section in Fig. 6. Into these grooves the follower-plate G' is inserted from the side, and secured in position by one or more pins or screws, $g^3$. On the rear face of the shield $G^2$, at suitable distances, screw-holes are provided, as shown in Fig. 4, by means of which the locking-strips $g$ are attached to it. These locking-strips are made of suitable length, preferably of metal, and at proper intervals corresponding to the positions of the feeding-tubes are hollowed out to receive the piston-rods, or the stem of the rods $b^3$, which slide loosely therein. Between the shield $G^2$ and the plate G' is an open space corresponding to the length of the shoulders $g^2$ $g^2$, which permits the plate and shield to be drawn back to remove the pressure from the rear of the pistons, when desired, without drawing the piston-heads away from contact with the plastic mass in the feeding-tubes, as in this arrangement of the pistons and follower-plate the pistons are not attached to the plate, but merely abut against it when it is moved forward. By moving back the plate and shield slightly the plate G' may be readily withdrawn without withdrawing the pistons from the feeding-tubes, when for any reason access to the pistons or any of them is desired.

The pistons which I prefer to use for general work are constructed as follows: A suitable head, $c$, is made to fit the feeding-tube $a$. On its rear end it is hollowed out, as shown in section in Fig. 8, to receive the ball $c^3$, which is inserted therein, and a washer, $c^2$, of corresponding suitable configuration, is secured over it, making in effect a ball-and-socket connection. From the ball $c^3$ a threaded neck projects, which is screwed into the piston-rod $b^2$. As before stated, the piston-rod consists preferably of iron gas-piping. Into the rear end of the piston-rod $b^2$ is screwed a regulating-stem, $b^3$, which has a head, $b^4$, screwed onto it. By this arrangement any of the pistons may be regulated by means of the stem $b^3$, and lengthened or shortened at any time, as desired, by simply withdrawing the follower-plate G' and screwing the stem $b^3$ into or out of the pipe $b^2$.

When the feeding-tubes are made so that all of them discharge proportionately equal amounts of the plastic material under the same pressure with reference to the pattern-forms, the devices heretofore described for the piston-rods and actuating mechanism will answer any purposes required. As in some patterns, however, it may be more convenient or cheaper to use some feeding-tubes in the system which are not exactly graduated to discharge the required amount of material with reference to the other figures under the same pressure, or when for any reason in the operation of the machine it becomes necessary to vary the pressure on the mass in some of the feeding-tubes, I arrange for that purpose an automatic pressure-regulator, as shown in Figs. 10 to 14. I ascertain how much (more or less) pressure is required in the particular feeding-tube under consideration, which variation, of course, will be very slight at each discharge of the plastic mass, as it is contemplated to use tubes of very nearly the exact size required, and I determine how much the piston-rod should be lengthened or shortened at each operation for the variation required, which is to be accomplished by screwing the regulating-stem $b^3$ into or out of the piston-rod $b^2$. For such piston a stem having a longitudinal groove, $b^5$, is then provided. Having determined the exact distance which the stem must be turned at each operation to produce the variation required, I prepare a ratchet-wheel, $d$, having its teeth the proper distance apart to turn the stem to the required point by moving the ratchet to the extent of one tooth at each operation. This wheel has a proper central bore to fit over the stem $b^3$, and a suitable pin, $d'$, is screwed to it to project into the groove $b^5$, so that the stem will turn with the wheel, and the wheel is free to slide lengthwise on the stem $b^3$. Behind the ratchet-wheel, and around the stem $b^3$, I arrange a spiral spring, $e$, and next to that I place the thimble $f$, which has an internal bore large enough to move over the screw-head $b^4$, and an internal shoulder or collar against which the spring $e$ presses, and an external circumference of proper size to advance the pawl $h$ to the required distance. Having arranged these parts on the stem $b^3$, I screw on the head $b^4$ and secure them in position.

The function of the spring $e$ is to keep the ratchet-wheel always against the face of the locking-strip $g$ and engaged with the pawl, and also to push back the thimble $f$ against the plate $G'$.

On the locking-strip $g$, at the proper point relative to the ratchet $d$, a suitable post, $i$, is secured to carry the pawl $h$, which is pivoted on such post, having its engaging-arm $h'$, which is vertically springy to allow it to pass over the ratchet-teeth and engage therewith. A spring, $j$, and a pin, $j'$, withdraw the pawl and regulate its scope of movement. The other arm, $h^2$, of the pawl is bent at an angle to the rear and adapted to slide upon the inclined face of the thimble $f$, as such thimble is pushed forward by the plate $G'$, and thereby the ratchet is turned to the required distance by the forward movement of the plate $G'$ before it touches the screw-head $b^4$, to operate upon the piston in forwarding the plastic material in the tubes, such ratchet, pawl, and thimble being in each instance of the proper size and relation for that purpose. The screw on the stem $b^3$ should work easily in the rod $b^2$, so as to turn freely with the ratchet, and the ball-connection with the piston-head $c$ should be stiff enough not to permit the ratchet to cause a turning there. For that purpose a washer of rubber or leather bearing upon the ball $c^3$ may be inserted between the head $c$ and the washer $c^2$ to stiffen the connection when necessary.

To cut off the plastic material when the same has been discharged to the thickness required, a suitable knife, K, is arranged to operate across the face of the pattern-mold B. This is preferably arranged, as shown in Figs. 15 and 16, to be operated in the slanting parallel ways $k\,k$, which are arranged at an angle to the side of the pattern-mold B, so that in pressing the knife down it will have a compound downward and sidewise movement, which I have found produces the cleanest cut for general purposes. A convenient device to operate the knife consists of the elbows $k'\,k^2$, pivoted to the knife, to each other, and to the ceiling, having a suitable handle, $k^3$, for the workman to grasp in pushing down the knife, and a suitable balance, $k^4$, to hold the knife in position out of the way when not in use.

On a suitable platform or table, A', corresponding to the table A and opposite to the pattern-mold B, I arrange a pressing plate or platen, L, which is preferably made hollow, to receive a suitable temperer, and provided with devices corresponding to the faucets D' $D^2$, and flexible tubes through which the same may be introduced and withdrawn. This platen L is made large enough to receive the pattern to be discharged through the mold B, and it is provided with prolonged feet and mounted in suitable ways corresponding to the follower-plate G, so that it will always be in a true line relative to the pattern-mold, and so that it may be moved up to and against the face of the pattern-mold and away therefrom, as may be necessary in operating the machine. The best way to arrange the platen for general work is to supplement it by a sliding plate, M, which is attached to it by the rods $n\,n$ near each corner. On these rods, between the platen L and the plate M, suitable pressure-springs are disposed to graduate the movement of the platen independently of the forwarding-screw O by means of the nuts $n'$. This plate M is actuated by the screw O, operating in the standard N, being turned by the wheel P. In operation the back fabric or other suitable receiver is held against the front of the pattern-mold B by the platen L, and by means of the springs $m$ the resistance of the platen to the mass to be discharged has to be regulated, this pressure varying according to the stiffness of the plastic material, care being necessary not to oppose enough pressure to cause a spreading of the material on its edges. When a back fabric is not to be applied to the plastic mass at the time of forming it into pattern-layers, a suitable pan or other receiver to receive the mass as it is discharged may be hung on the face of the platen and the material removed therein for future manipulation.

For supplying the back fabric, when that is to be used, a system of drums is arranged to pay out the same and carry along the sheet during the operation, which may be like that shown in Fig. 18. X is the back fabric, wound around a paying-out drum, R, which may be provided with a suitable brake to prevent it turning too freely. From this the fabric is carried around the presenting-cylinder $v$, which holds the fabric near the plane of the pattern-mold B. A forwarding-drum, W, carrying endless bands connecting it to other drums, and a holding-cylinder, $w$, which holds the structure close to the drum W after the plastic material has been disposed upon it, afford a suitable arrangement for that purpose. Around the ends of the cylinder W pins may be arranged to pierce the back fabric and hold it in position.

For carrying away the completed fabric the pins on the drum W and the endless bands $w'$ should be mostly depended on, and the roller $w$ should not be allowed to press too hard upon the plastic face, which may thereby be distorted. These drums and rollers R $v$ W $w$ should be made long enough to carry back fabric of the width required, which may be wider than the pattern-mold, as in working some patterns it may be desirable to shift the back fabric sidewise as well as lengthwise to make a structure two or more times the width of the particular pattern-mold used; but for many purposes it will be found sufficient to enlarge the pattern lengthwise only.

For some work the back fabric may be prepared with a cementing composition beforehand and dried, and the cement rendered active by contact with the heated platen L, while in other work it may be more convenient to apply the cement in the operation of laying on the plastic composition. When that is the case I interpose a cement-trough, S, between the paying-out drum R and the roller $v$, which is furnished with a distributing-roller, $s$, to lay on the cement, and a doctor or scraper, $s'$, to take off any superfluous quantity of the same.

The pattern-mold may be arranged to have all the figures of the pattern on the side in a straight line, or, as in the pattern-mold B in the drawings, some of the figures, as $B'$ $B'$, may project beyond the line of the others. In such a pattern, if I enlarge the same sidewise by depositing a second layer of the plastic material contiguous to the first layer, I leave empty in the second operation the tubes supplying the figures $B'$ $B'$; or, if desired, any projecting figures may be cut off when the material is finished.

In the drawings I have shown the feeding-tubes disposed horizontally and the pattern-mold vertical, and for most purposes I consider that the most convenient arrangement of the parts; but when desired the pattern-mold may be arranged in a horizontal position and the feeding-tubes vertically, to eject the plastic mass onto a suitable foundation prepared for it. That would be a convenient arrangement when it is desired to discharge the plastic mass into a pan or other suitable receiver to hold it in position in the form of thick slabs, to be afterward further manipulated, and eventually cut into thin slices by a band-knife or other suitable cutter, and applied directly to articles of furniture and kindred uses.

The operation is as follows: The tubes $a$ having been filled with the plastic materials to be operated, the pistons are inserted and connected with the following devices: The backing fabric is arranged on the drums and brought opposite to the pattern-mold B. Then the platen L is advanced until it presses the back fabric against the pattern-mold. Then the pistons are advanced until as much of the plastic mass has been forced out of the mold as is required for the purposes in hand. This pushes back the platen against the action of the regulating-springs $m$ $m$. Then the follower-plate is drawn back slightly to remove the pressure of the pistons, and to bring the automatic piston-pressure-varying devices into action when any are used. At the same time the platen L is also screwed back to afford room for the knife, which is then brought down and cuts off the plastic mass of the thickness desired. The back fabric is then again adjusted to receive the next layer of the plastic material, and the operations are repeated until the work desired has been made up, or the material has been exhausted, when a fresh supply may be inserted and the work continued.

In some instances, and especially when the plastic mass to be used has not sufficient firmness to permit its ejection against the retiring platen without spreading at the edges of the pattern, I may regulate the springs $m$ $m$ so that they will hold the platen substantially rigid, then move the back fabric and the platen up to the pattern-mold and advance the plungers to fill the mold densely, the platen pressing against it, then move back the pistons slightly, but not enough to bring the pressure-varying devices into action, then withdraw the platen and move the pistons forward again to eject the material to the thickness desired, and then cut it off, as before. Then, if any pressure-varying devices are employed, the follower-plate $G'$ must be moved back far enough to bring them into action before repeating the operation, otherwise the back and the platen may be at once advanced and the operation repeated.

When no back fabric is used, of course the drums, &c., will not be brought into action, but the plastic mass will be carried away in the pans for further manipulation.

The plastic materials, the pigments for coloring the same, the methods of cooling, heating, drying, trimming, pressing, grinding, or cutting down the face of the material, or splitting the same, when desired, after the pattern layers are formed, attaching or cementing the layers to a base, or directly to the article on which the same are to be used, may be such as are well known in the arts.

It will be evident that a great variety of effects can be produced with any pattern-mold by simply changing the colors of the different figures of the pattern.

In this application I do not claim the product or the process of constructing the floor-cloths and other various structures which may be made by my machine and invention, as described herein, but these are the subject of independent application for Letters Patent.

I do not limit myself to the exact parts and the particular mechanical devices described, as these may all be varied without departing from my invention.

Having thus described my invention, what I claim as new, and desire to secure by Letters Patent, is—

1. A machine for making floor-cloth and kindred articles of plastic materials in patterns of various colors, provided with a pattern-mold, as B, feeding-tubes $a$, pistons $b$ operating in such tubes, and a suitable device adapted to actuate such pistons, in combination with means, substantially as described, to present a base fabric to the pattern-mold, the platen L, adapted to support the same in position, and a knife, K, operating across the face of the pattern-mold, the whole operating substantially as described and shown.

2. In a machine adapted to form plastic material, into pattern-layers containing various colors, a pattern-mold having independent feeding-tubes adapted to supply material for each figure of the pattern, a suitable device to forward such material through the tubes, and a foundation adapted to receive the material as the same is discharged through the pattern-mold, substantially as described.

3. In a machine adapted to form plastic materials into pattern-layers containing various colors, a series of feeding-tubes, a, terminating in pattern-forms arranged contiguously to each other, substantially as described.

4. In a machine adapted to form plastic materials into pattern-layers containing various colors, a series of feeding-tubes, a, in combination with a surrounding jacket, D, adapted to receive a temperer, substantially as described.

5. In a machine adapted to form plastic materials into pattern-layers containing various colors, the feeding-tubes a, pistons adapted to operate therein, in combination with the follower-plate G' and shield G², having an open space between them, substantially as described.

6. In a machine adapted to form plastic materials into pattern-layers of various colors, the feeding-tubes a, provided with pistons adapted to operate therein, such pistons having a facing of moisture-retaining material, substantially as described and shown.

7. A system of pistons adapted to forward material through the feeding-tubes a, a suitable device to actuate the same, in combination with the movable guide-plate F, substantially as described.

8. The pistons b, the follower-plate G' and shield G², in combination with the locking-bars g, substantially as described.

9. The pistons b, ratchet d, pawl h, and spring e, in combination with the thimble f, adapted to operate the stem $b^3$, substantially as described.

10. The pattern-mold B, knife K, and knife-guides k k, in combination with a suitable device adapted to operate such knife across the face of the pattern-mold, substantially as described.

11. The movable platen L, forwarding-plate M, and regulating-springs m, in combination with a suitable device adapted to actuate such platen, substantially as described.

12. The paying-out drum R, cementing-trough S and its distributer, and the forwarding-roller W, in combination with the platen L, pattern-mold B, and knife K, substantially as described.

GUSTAV SCHWARZWALD.

Witnesses:
NELSON ZABRISKIE,
J. OSCAR WEEKS.